(No Model.)
H. M. IRWIN.
GANG PLOW.
No. 380,895. Patented Apr. 10, 1888.
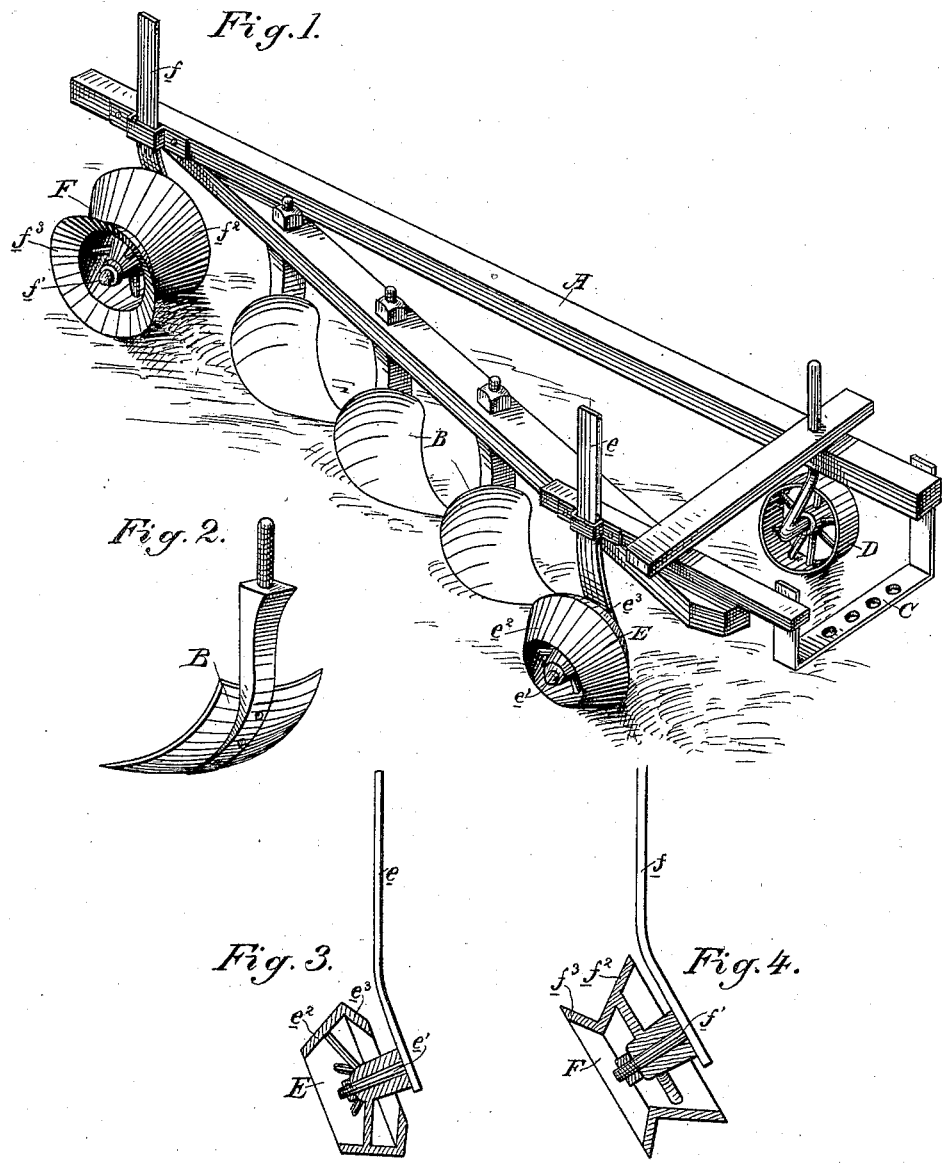
Witnesses,
Geo. H. Strong
J. H. Rouse
Inventor,
H. M. Irwin.
By Dewey & Co.
Atty

UNITED STATES PATENT OFFICE.

HALL MORRISON IRWIN, OF HANFORD, CALIFORNIA.

GANG-PLOW.

SPECIFICATION forming part of Letters Patent No. 380,895, dated April 10, 1888.

Application filed December 1, 1887. Serial No. 256,719. (No model.)

*To all whom it may concern:*

Be it known that I, HALL MORRISON IRWIN, of Hanford, in the county of Tulare and State of California, have invented an Improvement in Gang-Plows; and I hereby declare the following to be a full, clear, and exact description thereof.

My invention relates to the class of gang-plows; and my invention consists in the novel construction of the running surfaces or rims of the inclined wheels of said plow.

The object of my invention is to steady and guide the plow by so constructing the rims or running surfaces of its inclined wheels that they shall present a broad surface squarely to the ground and a surface squarely to the land side of the furrow previously made.

Referring to the accompanying drawings, Figure 1 is a view of the plow. Fig. 2 is a detail of one of the plow-bottoms. Figs. 3 and 4 are cross sections of the front and rear wheels.

A is the frame of the plow, to which are secured, in the usual manner, the plow-bottoms B, said bottoms being of the ordinary character, with the exception, however, that the usual landside, or anything corresponding to it, is omitted, for the reason that it is not necessary to steady the plow, this being effected by the inclined wheels, as I shall now describe.

C is the clevis of the plow.

D is the ordinary swivel or pivot wheel, supporting one side of the front of the plow, and which travels upon the unplowed ground.

E is a wheel on the right side of the front of the plow-frame, said wheel being supported by a suitable standard, $e$, secured to the frame of the plow. The wheel is carried on an axle, $e'$, which is set at an angle of about thirty degrees, and said wheel has a wide main rim, $e^2$, in the shape of a frustum of a cone, so that on account of this shape it runs squarely in the bottom of the furrow previously made, notwithstanding the inclination of its axle.

The wheel E is provided with a secondary or supplementary rim, $e^3$, on its inner surface, which is also conical in shape, and its base joins the base of the main rim at about a right angle. This secondary rim, by reason of its shape, though the wheel is mounted on the inclined axis, travels squarely against the landside of the furrow previously made, and in the bottom of which the main rim is traveling squarely.

F is a wheel at the rear end of the plow and carried by a suitable standard, $f$. This wheel is mounted on an axle, $f'$, which is secured to the standard at an angle of about thirty degrees, and it has a wide main rim, $f^2$, which is in the shape of a frustum of a cone, so that said rim travels squarely on the unbroken land. The wheel has also a secondary rim, $f^3$, which is also in the shape of a frustum of a cone, and the smaller ends of the two rims joining at an angle of about ninety degrees. The rim $f^3$ of the wheel F is adapted to travel squarely against the land side of the furrow which is made by the plow-bottom directly in front of it. Now, by reason of the wide main rims of the two wheels E and F traveling squarely on the ground, the one in the bottom of the furrow previously made and the other on the unbroken ground, and by reason of their secondary rims $e^3$ $f^3$ traveling against the land side, the one of the furrow previously made and the other of the furrow made by the plow-bottom immediately in front of it, the whole frame of the plow is steadied and guided in such a manner as to permit me to dispense with any landside or anything corresponding to a landside on the plow-bottoms themselves, and also to dispense with a tongue, which has heretofore been necessary to steady the plows with inclined wheels.

By dispensing with the landsides of the plow-bottoms I avoid the usual friction of said landsides, and by having the rims of the inclined wheels traveling squarely on the ground I avoid the friction which is usually present when using the ordinary inclined wheels of the plows of this class.

I am aware that in gang-plows inclined wheels are not new, and I do not therefore claim such, broadly; but What I do claim as new, and desire to secure by Letters Patent, is—

In a gang-plow, the frame of said plow having the swiveled wheel D on one side of its front, and the plow-bottoms B, unprovided with landsides, in combination with the inclined double-rimmed wheels E and F in front of and behind the plows, the main rim of said wheels traveling squarely, the one in the bottom of the furrow previously made and the other on the unplowed ground, and the secondary rim of said wheels traveling against the landsides, the one of the furrow previously made and the other of the furrow made by the plow-bottom immediately in front of it, substantially as described.

In witness whereof I have hereunto set my hand.

HALL MORRISON IRWIN.

Witnesses:
SAMUEL REY,
A. E. MCCLANAHAN.